(No Model.)

D. MACE.
HOOF EXPANDER.

No. 307,208. Patented Oct. 28, 1884.

Attest:
F. J. Campbell.
Edward G. Kempf.

Inventor:
Daniel Mace,
by Drake & Co.
Att'ys.

UNITED STATES PATENT OFFICE.

DANIEL MACE, OF NEW YORK, N. Y.

HOOF-EXPANDER.

SPECIFICATION forming part of Letters Patent No. 307,208, dated October 28, 1884.

Application filed April 24, 1884. (No model.)

*To all whom it may concern:*

Be it known that I, DANIEL MACE, a citizen of the United States, residing at New York, in the county of New York and State of New York, have invented certain new and useful Improvements in Hoof-Expanders; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Heretofore hoof-expanders have been formed of bent metallic rods, but have been objectionable for various reasons. In one case, referring especially to United States Patent No. 182,608, where the rod was bent into a V shape similar to the device herein shown, the said rod was provided with springs to press against the frog of the horse's foot, and thus hold the expander in position. The expander, where the arms thereof joined, was vertically flattened, and thus constructed could not readily pass between the shoe and hoof without cutting the latter away. The pressing of the frog by the spring tended to injure the foot; and it is one object of my invention to remedy this difficulty, as well as provide a more perfect fastening for the expander. In another case (see Patent No. 239,550) the expander is formed of a rod or wire bent to form an eye or eyes. In the first example shown in this patent the bar is bent, one portion crossing the arms in such a manner as to form a series of angles. In the second example the arms themselves are sharply bent in their course from the toe to the heel of the foot. In this case, also, angles are formed, and because of these angles the expander is extremely liable to catch upon or pick up stones, to the injury of the horse's foot. A further object is, then, to reduce or entirely overcome this liability.

The invention consists in the improved hoof-expander constructed and adapted to operate substantially as will be hereinafter set forth.

Figure 1:
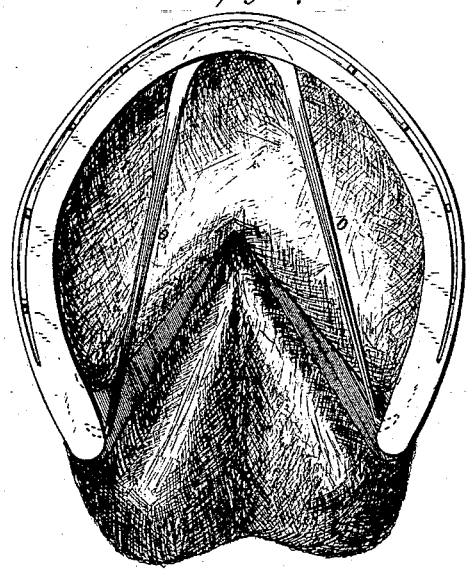
Figure 2:
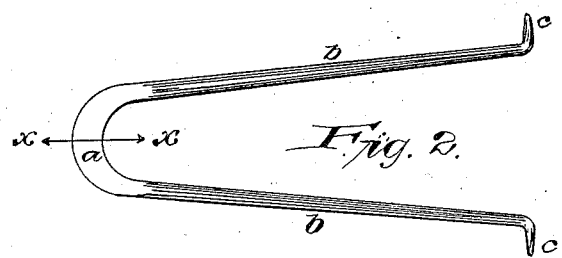

Referring to the drawings, in which similar letters of reference indicate like parts in each of the several figures, Figure 1 is a plan of the under side of a horse's foot with the shoe thereon, showing the relation of the expander to them. Fig. 2 is a plan of the expander detached from the hoof, and Fig. 3 is a section taken through line $x$.

Figure 3:
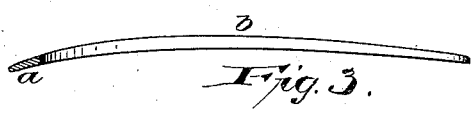

In carrying out the invention I form the expander from a continuous spring wire or bar, which is once bent at $a$ or given one simple turn to form expanding-arms $b\ b$, said bent portion being flattened, as shown in Fig. 3, to pass between the hoof and shoe, as shown in Fig. 1. The arms $b$ are curved longitudinally, as shown in elevation in Fig. 3, to lie in close contiguity to the hoof, are straight in plan, as in Fig. 2, from where they project from under the shoe to the heel, to prevent stones, &c., from being held between the arms of the expander and the hoof, and have outwardly bent and pointed extremities $c$, to engage with the heel of the crust. The spring action of the arms tends to force said heel outwardly. Thus constructed, the exposed portions of the expander are devoid of angles formed at or near the center of the hoof by one portion crossing another or the arms being sharply bent, or, again, by projecting springs attached to said arms, so that the horse in traveling is not exposed to the danger of being injured in the manner above explained.

Having thus described the invention, what I claim as new is—

The improved hoof-expander herein shown and described, consisting, essentially, of the arms $b\ b$, straight in plan and curved in elevation, as shown, and connected together by the once-bent and horizontally-flattened portion, adapted to pass between the shoe and the horse's hoof at the toe thereof, the said arms being turned outward and pointed at their extremities to engage the heel, the said expander being devoid of angularly bent or crossing portions at or near the center thereof, substantially as herein described.

In testimony that I claim the foregoing I have hereunto set my hand this 11th day of January, 1884.

DANIEL MACE.

Witnesses:
 EDW. PHILLIPS,
 ROBERT PELBEAM.